US011424908B2

(12) United States Patent
Bartolucci et al.

(10) Patent No.: US 11,424,908 B2
(45) Date of Patent: Aug. 23, 2022

(54) SYSTEMS AND METHODS FOR COMMUNICATION, STORAGE AND PROCESSING OF DATA PROVIDED BY AN ENTITY OVER A BLOCKCHAIN NETWORK

(71) Applicant: nChain Licensing AG, Zug (CH)

(72) Inventors: Silvia Bartolucci, London (GB); Pauline Bernat, London (GB); Daniel Joseph, London (GB)

(73) Assignee: nChain Licensing AG, Zug (CH)

( * ) Notice: Subject to any disclaimer, the term of this patent is extended or adjusted under 35 U.S.C. 154(b) by 168 days.

(21) Appl. No.: 16/635,973

(22) PCT Filed: Jul. 26, 2018

(86) PCT No.: PCT/IB2018/055589
§ 371 (c)(1),
(2) Date: Jan. 31, 2020

(87) PCT Pub. No.: WO2019/025913
PCT Pub. Date: Feb. 7, 2019

(65) Prior Publication Data
US 2021/0143974 A1    May 13, 2021

(30) Foreign Application Priority Data

Aug. 3, 2017  (GB) .................................... 1712493

(51) Int. Cl.
*H04L 29/06*    (2006.01)
*H04L 9/00*    (2022.01)
(Continued)

(52) U.S. Cl.
CPC ............ *H04L 9/006* (2013.01); *H04L 9/0643* (2013.01); *H04L 9/085* (2013.01); *H04L 9/3213* (2013.01);
(Continued)

(58) Field of Classification Search
CPC ....... H04L 9/006; H04L 9/0643; H04L 9/085; H04L 9/3213; H04L 9/3239; H04L 2209/38
See application file for complete search history.

(56) References Cited

U.S. PATENT DOCUMENTS 6,772,339 B1 *  8/2004  Jakobsson ............. H04L 9/0841
                                                 713/180
10,050,779 B2    8/2018  Alness et al.
(Continued)

FOREIGN PATENT DOCUMENTS

CN    102131188 A  *  7/2011  ......... H04L 63/0414
CN    106453286 A      2/2017
(Continued)

OTHER PUBLICATIONS

Ziegeldorf, Jan Henrik, et al. "Coinparty: Secure multi-party mixing of bitcoins." Proceedings of the 5th ACM Conference on Data and Application Security and Privacy. 2015. (Year: 2015).*
(Continued)

*Primary Examiner* — Shawnchoy Rahman
(74) *Attorney, Agent, or Firm* — Davis Wright Tremaine LLP

(57) ABSTRACT

A computer-implemented method for submitting feedback for an entity to a blockchain is disclosed. The method, which is implemented at one of a plurality of participating nodes, includes: obtaining a first key, the first key being one of a fixed set of keys distributed to participating nodes that are eligible to submit feedback for the entity; generating first feedback (rj) of the entity for submission to the blockchain; encrypting the first feedback (rj) using at least the first key; and submitting the encrypted first feedback to a mixing service, the mixing service being configured to generate a mixed transaction based on the encrypted first feedback and
(Continued)

at least one other encrypted feedback submission from one or more eligible participating nodes.

20 Claims, 6 Drawing Sheets

(51) Int. Cl.
*H04L 9/06* (2006.01)
*H04L 9/08* (2006.01)
*H04L 9/32* (2006.01)

(52) U.S. Cl.
CPC ........ *H04L 9/3239* (2013.01); *H04L 2209/38* (2013.01)

(56) References Cited

U.S. PATENT DOCUMENTS

| | | | |
|---|---|---|---|
| 2007/0283161 A1* | 12/2007 | Yami | H04L 9/3226 713/183 |
| 2016/0028552 A1 | 1/2016 | Spanos et al. | |
| 2017/0061398 A1 | 3/2017 | Joseph | |
| 2017/0063559 A1* | 3/2017 | Wallrabenstein | H04L 9/3026 |
| 2017/0109955 A1 | 4/2017 | Ernest et al. | |

FOREIGN PATENT DOCUMENTS

| | | | | |
|---|---|---|---|---|
| CN | 110188549 A | * | 8/2019 | |
| WO | WO-2014093224 A1 | * | 6/2014 | ........... H04B 1/3888 |

OTHER PUBLICATIONS

Y. Liu, X. Liu, C. Tang, J. Wang and L. Zhang, "Unlinkable Coin Mixing Scheme for Transaction Privacy Enhancement of Bitcoin," in IEEE Access, vol. 6, pp. 23261-23270, 2018, doi: 10.1109/ACCESS.2018.2827163. (Year: 2018).*
Antonopoulos, "Mastering Bitcoin—Unlocking Digital Cryptocurrencies," O'Reilly Media, Inc., Dec. 20, 2014, 282 pages.
Ethereum Reddit, "Why are There No Blockchain Based Voting Systems Yet?" retrieved from https://www.reddit.com/r/ethereum/comments/59ccyi/why_are_there_no_blockchain_based_ voting_systems/, Oct. 25, 2016, 23 pages.
Helios, "Helios Voting," retrieved from https://web.archive.org/web/20160810095052/https://vote.heliosvoting.org/faq, Aug. 10, 2016, 4 pages.
International Search Report and Written Opinion dated Sep. 28, 2018, Patent Application No. PCT/IB2018/055589, 11 pages.
Maiavictor, "How to Create a Decentralized Secret Ballot Among a Small Group of People?" retrieved from https://crypto.stackexchange.com/questions/39261/how-to-create-a-decentralized-secret-ballot-among-a-small-group-of-people, Aug. 9, 2016, 1 page.
Meter, "Design of Distributed Voting Systems," Feb. 8, 2017, 125 pages.
Möser, "Anonymity of Bitcoin Transactions," retrieved from https://www.wi.uni-muenster.de/sites/wi/files/public/department/itsecurity/mbc13/mbc13-moeser-paper.pdf, Jul. 18, 2013, 10 pages.
Nakamoto, "Bitcoin: A Peer-to-Peer Electronic Cash System," Bitcoin, Oct. 31, 2008, https://bitcoin.org/bitcoin.pdf, 9 pages.
Openbazaar, "Protocol—OpenBazaar Docs," retrieved from https://web.archive.org/web/20170617003245/https://docs.openbazaar.org/03.-OpenBazaar- Protocol/, Jun. 17, 2017, 30 pages.
Satoshi et al., "Connection Limits," Bitcoin Forum, Aug. 9, 2010, https://bitcointalk.org/index.php?topic=741.0; prev_next=prev, 2 pages.
Schaub et al., "A Trustless Privacy-Preserving Reputation System," retrieved from https://eprint.iacr.org/2016/016.pdf, 2016.
Soska et al., "Beaver: A Decentralized Anonymous Marketplace with Secure Reputation," retrieved from https://eprint.iacr.org/2016/464.pdf, 2016, 15 pages.
Tarasov et al., "Internet Voting Using Zcash," International Association for Cryptologic Research, Jun. 15, 2017, 8 pages.
UK Commercial Search Report dated Dec. 1, 2017, Patent Application No. GB1712493.4, 7 pages.
UK IPO Search Report dated Jan. 16, 2018, Patent Application No. GB1712493.4, 6 pages.
Valenta et al., "Blindcoin: Blinded, Accountable Mixes for Bitcoin," Medical Image Computing and Computer-Assisted Intervention, Sep. 5, 2015, 16 pages.
Yang et al., "Survey of Confidentiality and Privacy Preserving Technologies for Blockchains," R3, retrieved from https://z.cash/static/R3_Confidentiality_and_Privacy_Report.pdf, Nov. 14, 2016, 32 pages.

* cited by examiner

SYSTEMS AND METHODS FOR COMMUNICATION, STORAGE AND PROCESSING OF DATA PROVIDED BY AN ENTITY OVER A BLOCKCHAIN NETWORK

This invention relates generally to cryptographically-enforced data recording and processing systems. In particular, the invention relates to a technical solution for communicating, recording and/or storing data provided to the system by an entity via or over a blockchain network. The data may be indicative of, for example, a selection, choice, feedback and/or decision. The invention provides techniques for secure storage and communication of such data between entities over the blockchain network, and ensures the integrity of the data that is transferred and used post-transfer. It also alleviates issues relating to identification of the source of such data on a network, to prevent authorised activity. The invention is suited for, (but not limited to) voting, electronic feedback submission, or counting applications, or other applications where data integrity, source concealment and enforcement of usage quotas or limits may be of importance.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be (i) validated by the first node that receives the transaction—if the transaction is validated, the node relays it to the other nodes in the network; (ii) added to a new block built by a miner; and (iii) mined, i.e. added to the public ledger of past transactions. Once recorded, the data in any given block cannot be altered retroactively without altering all subsequent blocks and a collusion of the network majority.

Transactions involve the transfer of one or more tokens from one node to another node. Tokens may represent future control of network resources. In some cases, the tokens may represent an asset or value, but not necessarily. For example, in some cases, the tokens may be understood as a cryptocurrency. However, the present application is not limited to implementations in the context of cryptocurrency and is more broadly understood as relating to blockchain networks for distributed transfer of control tokens.

A blockchain serves as a public ledger that can record transactions between parties in a verifiable and permanent way. Blockchains possess numerous properties, such as irrevocability of information stored on-chain and trust established through decentralized consensus, which make them suitable for use in various applications. One such application is electronic voting. It should be noted that the term "voting system" is not limited herein to political or administrative contexts, but is used in a generic sense to simply mean a system which enables a selection, choice, decision or parameter (i.e. a vote) to be transferred, recorded, stored, processed and/or registered in some way. Thus, the invention relates to improved communication, storage and security of data between entities.

Many types of computer-implemented systems need to enable an indication of a choice/decision, or other data, to be communicated across a network, so that the data can be acted upon or processed in some way. In many cases, it is desirable to be able to enforce certain rules or criteria relating to the number of times that a selection can be made. In other words, there may be a quota or limit to the number of times a selection or choice can be made. For the sake of convenience and ease of reference only, we may refer to such a system as an "e-voting" system but this should not be construed as limiting the invention to political or administrative contexts. Alternatively, the term "data recording system" may be used to reflect the wider applicability of the invention. The invention is not limited with regard to the type or nature of data received, recorded and stored.

A secure and reliable system for e-voting should prevent vote manipulation while preserving voter privacy (a cast vote should not be known to any participant other than the voter) and correctness of submitted ballots (invalid or unauthorized ballots should be excluded, while valid votes should count toward the final tally). Blockchains may also find practical application as platforms for recording and publishing author-originating data and information, such as feedback, opinions, reviews and evaluations. Feedback, in the form of, for example, numerical ratings or reviews, can influence consumer trust in products, services, and marketplaces. As a consequence, there may be incentives for submitting positive/negative feedback to try to manipulate audience or market perceptions. A blockchain may provide an appropriate environment for deterring vote and feedback manipulation (e.g. modification, deletion, etc.), by allowing votes/feedback to be recorded publicly and permanently on an open, distributed ledger, without reliance on a central authority to validate the votes/feedback.

While the potential for deploying voting/feedback platforms using blockchains is attractive, numerous other issues, such as prevention of multiple ballot submissions, credential checking, and preservation of user privacy, remain to be addressed. In particular, preserving voter/reviewer privacy may require anonymization in the vote/feedback submission process. While blockchain technologies, such as Bitcoin, may provide pseudo-anonymity of transactions, it is possible, using secondary data (e.g. a shipping address required to complete a transaction) and analytics, for interested third parties to combine publicly available information to associate the identities of users to specific Bitcoin addresses. Without appropriate precautions, data (e.g. votes, selections, decisions, feedback, etc.) that is submitted and recorded on the blockchain may be traceable to their source. A lack of anonymity may, in turn, adversely affect the integrity of a data submission process. In other applications, too, it is often desirable to hide or conceal the source of the data received by the system as this can give rise to targeting of the source. Security can be enhanced by removing traceability of the source of the data.

Thus, it is desirable to provide improved methods and devices for facilitating privacy-preserving submissions of data across a computer-implemented network. Such an improved solution has now been devised.

In accordance with the present invention there are provided methods and devices as defined in the appended claims.

The invention may provide a computer-implemented method and corresponding system. The method/system may be described as a blockchain-implemented method/system. The invention may be described as a security method or cryptographic method/system, or cryptographically-enforced method/system. It may provide for the secure transfer of a digital asset (or "resource") such as a portion or quantity of cryptocurrency. Additionally or alternatively, it may provide a control mechanism for controlling the transfer of a digital asset such as a portion or quantity of cryptocurrency.

Additionally or alternatively, the present application may describe a computer-implemented method for submitting data from an entity to a blockchain. The data may be any type of data, including (but not limited to) feedback, decisions, selections ("votes") or reviews. Additionally or alternatively the invention may be described as a data transfer method. It may be arranged to enable transfer of data from an entity to a blockchain.

The method may be implemented at one of a plurality of (participating) nodes. These may be nodes that are arranged to participate in a process for submitting and/or verifying data (e.g. feedback) in accordance with the various techniques described herein. The method may include: obtaining a first key, the first key being one of a fixed set of keys distributed to participating nodes that are eligible to submit data for the entity; generating first data ($r_j$) for the entity for submission to the blockchain; encrypting the first data ($r_j$) using at least the first key; and submitting the encrypted first data to a mixing service, the mixing service being configured to generate a mixed transaction based on the encrypted first data and at least one other encrypted data submission from one or more eligible participating nodes.

In some implementations, the first key may be a first key share ($k_j$) of a private key (k), the first key share ($k_j$) being one of a plurality of key shares that are distributed to eligible participating nodes and that are used for collaboratively constructing the private key (k)

In some implementations, the first data ($r_j$) may be encrypted using the first key share ($k_j$) and a public key ($Pk_{C_i}$) associated with the entity.

In some implementations, the method may further include: encrypting the first key share ($k_j$) using the public key ($Pk_{C_i}$) associated with the entity; collaborating with other eligible participating nodes to generate a secret (kG) using the first key share ($k_j$); and providing the encrypted first key share ($k_j$) and the generated secret (kG) to an entity node associated with the entity for use in verifying the validity of the first key share ($k_j$).

In some implementations, the secret (kG) may be collaboratively generated based on a secret share joining process.

In some implementations, the first data ($r_j$) may comprise an alphanumeric string.

In some implementations, the first data ($r_j$) may comprise a concatenation of a review string and a second string containing at least a portion of a public key ($Pk_{C_i}$) associated with the entity.

In some implementations, the first data ($r_j$) may further include a third string identifying a service provided by the entity.

In some implementations, obtaining the first key may comprise receiving the first key share ($k_j$) from the entity.

In some implementations, the first key share may be received from the entity in response to a transfer of tokens to an entity node associated with the entity for a service rendered by the entity.

In some implementations, the first data ($r_j$) may be encrypted using an exclusive- or encryption.

In some implementations, the first key ($k_i$) may be a first public key ($Pk_{C_i}^j$) associated with the entity, the first public key ($Pk_{C_i}^j$) being one of a first set of node-specific public keys that are generated by the entity and that are distributed to eligible participating nodes, each of the public keys in the first set having a corresponding private key that is retained by the entity.

In some implementations, the mixed transaction may specify a first quantity of tokens to transfer to the entity, the first quantity depending on a number of encrypted data submissions for the entity that are included as inputs in the mixed transaction.

The present application further describes a computing device for performing the described methods, where the computing device is one of a plurality of participating nodes and includes at least one processor, memory, a network interface to provide network connectivity, and a blockchain application containing processor-executable instructions that, when executed, cause the processor to carry out the operations of one or more of the methods described herein.

The present application further describes a non-transitory processor-readable medium storing processor-executable instructions to participate in a process for submitting feedback for an entity to a blockchain, where the processor-executable instructions, when executed by a processor in one of a plurality of participating nodes, cause the processor to carry out the operations of one or more of the methods described herein.

The present application describes systems and methods which facilitate secure, cryptographically enforced and efficient implementation of schemes for encrypting, validating, and broadcasting data items that are submitted by users to a blockchain. The users may, in some useful application, be participants in a voting or feedback platform. In some implementations, the present application provides protocols that are designed to prevent submissions of data from malicious actors. This can preserve the integrity and reliability of results which are produced by the system based on the received data.

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompany drawings, in which.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

We now provide an example of how the invention could be implemented, for the purposes of illustration only. In our example, the invention is implemented as a feedback submission platform but this is purely one convenient example of how the invention could be put into practice and is not intended to be limiting.

In the present application, the term "entity" refers to any entity that receives or is capable of receiving data (for example, feedback in the form of reviews, ratings, evaluations, comments, votes, etc.). An "entity" may additionally or alternatively refer to a representative that is authorized to receive and verify data such as votes/feedback on behalf of an entity. For example, an "entity" may be an organization, such as a service provider or a product manufacturer, a representative of an organization (e.g. the customer service department of a company collecting and posting client reviews), or a person (e.g. a political candidate, an employee, etc.). In the context of the data submissions protocol described herein, an entity may be represented by one or more nodes in a blockchain network. In some cases, an entity may solicit voters or users of their products to participate in a vote/feedback submission process. As data e.g. votes/feedback for an entity are submitted (by users, represented as participating nodes), the entity is able to verify the validity of the data, and publicly disclose the submissions, while maintaining the anonymity of the sources of the data, by broadcasting them on the blockchain ledger.

In the present application, a "reviewer" refers to an organization or an individual that submits data (including, but not limited to, reviews) for an entity. A reviewer may, for example, be a participant in the Blockchain-based Data Submissions Protocol (BDSP) disclosed herein. Alternatively, the phrase Blockchain-based Feedback Submissions Protocol (BFSP) may be used. A "reviewing node" is a node (in a blockchain network) that is associated with a particular reviewer, and a "participating node" is a node associated with a reviewer that participates in a verification or feedback submissions process, such as the BDSP of the present disclosure.

Figure 1:
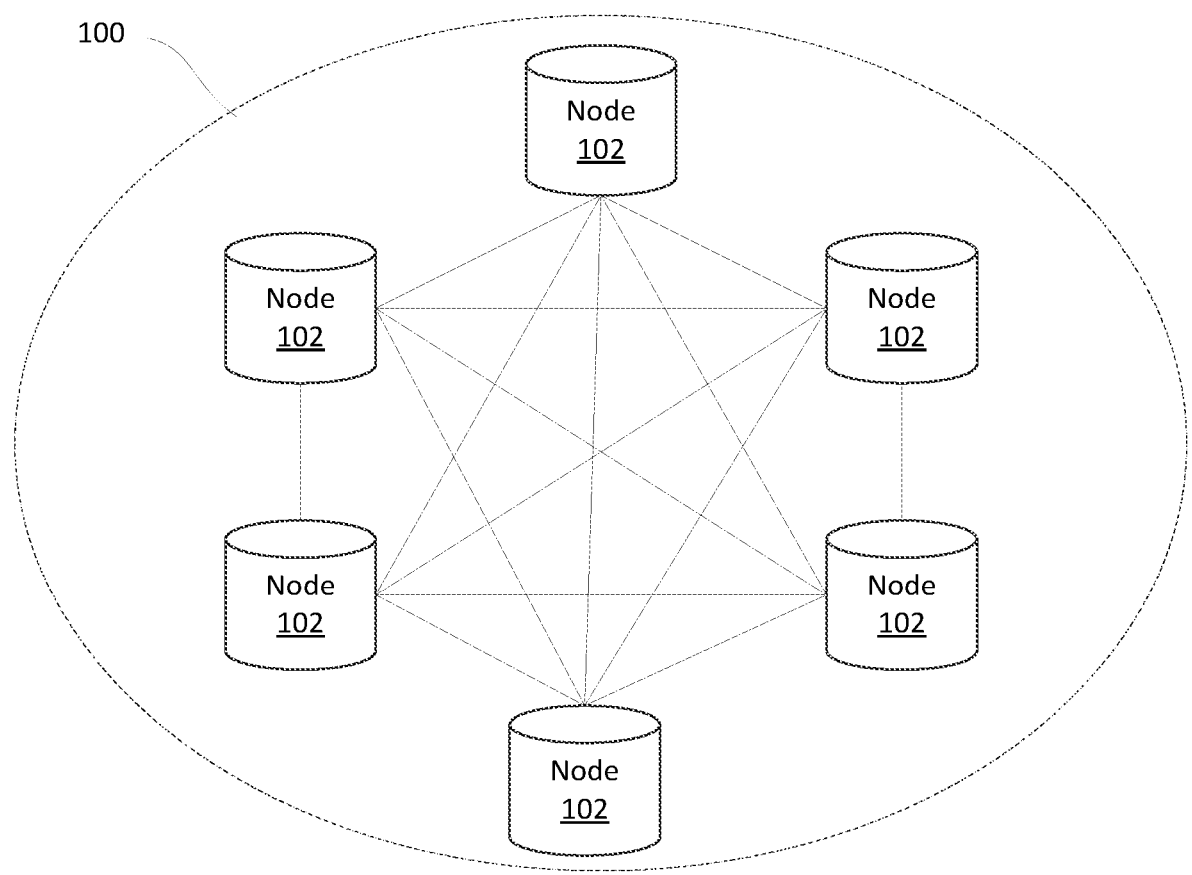
FIG. 1 illustrates an example blockchain network of nodes.

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which tokens are transferred as a result of the transaction. Those tokens are then associated with that output address as an available transaction output. In the context of a cryptocurrency, like Bitcoin, an available transaction output may be referred to as an unspent transaction output (UTXO). A subsequent transaction may then reference that address as an input in order to transfer those tokens to one or more other addresses.

While the transactions are pseudo-anonymous in that no personal information is contained in the transactions on the blockchain ledger, it is possible to trace the transfer of tokens in chains of transactions and, in some cases, to link tokens to an individual using external data. In order to increase anonymity, a mixing transaction may be used to pool inputs from a variety of sources and then to divide and allocate the pooled tokens to outputs. If all the inputs and outputs are the same size, it is difficult to associate a particular input with a particular output. However, in such transactions at least one participating node is aware of the linkage between an input address and output address specified by another participating node. In such mixing transactions, such as a CoinJoin operation in the Bitcoin protocol, a single transaction having multiple inputs and multiple outputs is used to mix the tokens.

Some other anonymizing techniques are used to try to avoid revealing links between an input and an output, such as ring signatures or stealth addresses, with varied effectiveness. Stealth addresses try to de-link the output address to which tokens are sent from a particular user. Ring signatures try to make a source untraceable by making it equi-probable that any one of a group of possible signatories was the one that signed/authorized a particular transaction.

The present disclosure provides a blockchain-based data submissions protocol. It may be described in some embodiments as a feedback submissions protocol. The term "feedback" may be used for convenience of illustration instead of "data" but is not intended to be limiting. More specifically, a protocol for submitting feedback using a blockchain ledger is disclosed. A participant of the protocol anonymously submits their feedback (e.g. review) for a product, service, entity, etc. to a specific entity. The feedback submission itself is encrypted and transmitted to the entity by means of a blockchain transaction created by the submitter of the feedback (e.g. reviewer). Upon receiving a feedback submission, the entity can verify the validity of the submission and, if valid, broadcast the feedback on the public ledger. The protocol does not rely on a trusted thirty party, and includes a mechanism to discourage eligible participants from casting multiple different feedback submissions and to prevent non-eligible ones from taking part in the process. Feedback submissions are anonymized by obscuring the connection between submitted feedback for an entity and the participant submitting the data e.g. feedback. In particular, a mixing service, such as a transaction output shuffling process, is employed to generate a mixed, or joint, blockchain transaction which delinks inputs (of participants) from their output (i.e. entity receiving feedback) addresses.

The proposed data submissions protocol may enable an entity to authenticate submitted data to ensure that only those submissions from eligible participants (such as endorsed, or previous, users of the entity's products or services) are accepted by the entity and broadcast on the blockchain. The proposed protocol leverages blockchain concepts to provide a system/platform for data e.g. feedback submissions (and verification) which facilitates anonymizing of data, proper delivery of data to the relevant entities, and incentivizing entities to undertake the tasks of verifying data submissions and publicly disclosing the eligible data on the blockchain.

In the proposed data submissions protocol, each data submission is included in a blockchain transaction that transfers tokens to the entity receiving the data. In particular, reviewers that participate in the protocol transfer ("pay") a fixed quantity of tokens to be able to submit their data. This "submissions fee" is collected by the relevant entity (or data verifier) upon successful broadcast of the data on the blockchain. Entities receiving data (e.g. being reviewed) are thus able to receive a quantity of tokens that is proportional to their share of data, as a "reward" for their verification of data submissions and disclosure of eligible data on the blockchain. A plurality of transfer transactions containing data submissions may be combined to form a single transaction with one or more outputs (corresponding to entities receiving submitted data), thereby increasing privacy by obfuscating the connections between data and their sources.

In the description herein, the terms "participating node", "candidate node", "input address", and "output address" may be used. The reference to an "address" of a node is not meant to refer to a network address of a physical node. Instead the "address" is an address specified in a transaction on the blockchain having an allocation of tokens to which the physical node can claim ownership by having a key that corresponds to a signature on the transaction. In this sense, the "output address" is not an address of a participating node, but is a blockchain transaction output address that is owned by or associated with a participating node. Likewise, the "input address" is an address of an available transaction output (in cryptocurrency terms, a UXTO) that is owned by or associated with a participating node.

As explained above, the blockchain-based data submissions protocol of the present disclosure is also suitable for deploying in the electronic voting (i.e. e-vote submission) context. Therefore, any discussion of "feedback" and feedback submissions protocols in the description will be understood to also apply to "votes" and voting protocols. Furthermore, the terms "rating" and "review" may be used interchangeably throughout the description, and will be understood as referring to a suitably formatted feedback (e.g. numerical rating, text, etc.) submitted by a reviewer (i.e. verifier) to an entity.

Secret Sharing

In a "secret sharing" scheme, a secret k is divided among n parties, such that at least t+1 of the n parties are required to collaborate in order to reconstruct k. Any subset of the n parties may reconstruct the secret k so long as the cardinality of the subset is greater than a specified threshold value t. If the cardinality of the subset is less than or equal to t, then no information about the secret k is revealed. The distribution of key shares among parties may be done using a central dealer who assigns key shares, or through a dealer-less system of distribution. Each solution has its advantages and disadvantages requiring careful consideration of the requirements of the system being implemented when choosing between distribution methods.

In the data submissions protocol of the present disclosure, key shares $k_1$, $k_2$, $k_3$, . . . $k_n$ of a key k may be used by reviewers to attest their membership to an endorsed group or otherwise demonstrate that they are eligible to participate in the protocol.

In some implementations, a secret sharing scheme may involve embedding the secret in a polynomial of degree t. An arbitrary secret, x, is stored as point $f(0)$ in a t-degree polynomial $f(x)$ and player i can calculate its share $f(x_i)$. If t+1 out of n parties collaborate, they can reconstruct any point on $f(x)$ with their respective shares (of key x) $x_1$, $x_2$, . . . , $x_n$ which correspond to $f(x_1), f(x_2), \ldots, f(x_n)$, using Lagrange Polynomial Interpolation. Lagrange Polynomial Interpolation tells us that a function $f(x)$ with degree t can be reconstructed with t+1 points, $p=\{(x_1, f(x_1)), (x_2, f(x_2)), \ldots, (x_{t+1}, f(x_{t+1}))\}$, namely by $$f(x) = \sum_{i \in p} f(x_i) \prod_{j \in p, j \neq i} \frac{x - x_j}{x_i - x_j} = \sum_{i \in p} f(x_i) b_{i,p}(x),$$

where $$b_{i,p}(x) = \prod_{j \in p, j \neq i} \frac{x - x_j}{x_i - x_j}, b_{i,p}(x_i) = 1, \text{ and } b_{i,p}(x_j) = 0.$$

One element of the secret sharing scheme is the determination of x×G, where x is the secret key and G is a point on the Elliptical Curve. If $f(x)$ is a t-degree polynomial, the secret x can be interpolated by $x = \sum_{i \in \pi} b_{i,\pi} k_i$, where $\pi$ is a size t+1 subset of shares $x_a$, $x_b$, . . . , $x_t$, $x_{t+1}$ and b is an interpolating factor. $\pi$ is a group of t+1 participants collaborating to calculate x×G without revealing their respective share, $x_i$. x is the x=0 point on a t-degree polynomial. To calculate x×G:

each participant i calculates a part $b_{i,\pi}x_i \times G$, and
all participants in π add their part together (reconstructing the secret x via Lagrange interpolation) giving:

$$b_{a,\pi}x_a \times G + b_{b,\pi}x_b \times G + \ldots + b_{i+1,\pi}x_{i+1} \times G = x \times G$$

This process of calculating $Q=x \times G$ is referred to as "Secret Share Joining".

Commitment Channels

Various blockchain technologies, such as Bitcoin, may sometimes employ "commitment channels" in the construction of pairwise transactions between network nodes. Commitment channels are designed to allow nodes to make multiple transactions without having all of the transactions committed to the blockchain. Once a commitment channel is established between a pair of nodes, the nodes can engage in as many transactions as they would like in a given time period, with only two of the transactions ultimately being added to the blockchain. As a result, the use of commitment channels can lead to a reduction in the number of transactions that are required to be added to the blockchain and a reduction in associated transaction costs. A commitment channel also offers a transferor node the flexibility of having tokens returned if specific criteria are not met by the transferee node or if either the transferor or transferee node determined to end the process after a certain set of transfers.

Figure 2:
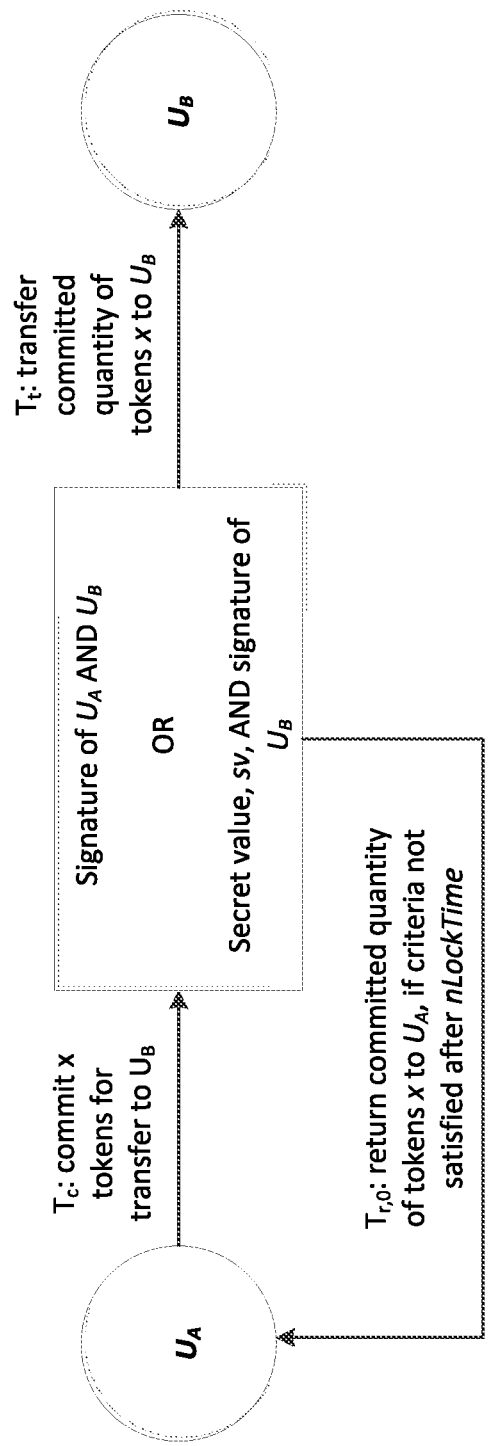
FIG. 2 shows a schematic diagram of a commitment channel established between a participating node and an entity node.

In at least one embodiment of a commitment channel implementation, a pair of network nodes, $U_A$ and $U_B$, collaborate to generate three blockchain transactions: a commitment transaction ($T_C$), a return transaction ($T_{r,0}$), and a transfer transaction ($T_t$). FIG. 2 shows a schematic diagram of a commitment channel $U_A \rightarrow U_B$ between transferor node $U_A$ and transferee node $U_B$. The commitment transaction, $T_C$, represents the commitment component of the commitment channel in which the transferor $U_A$ sends/commits a specified set of tokens, x, for transfer to $U_B$. The commitment transaction may, in some embodiments, be a 2-of-2 multi-signature pay-to-script-hash (P2SH) transaction. The return transaction, $T_{r,0}$ is a transaction that returns the previously committed tokens, x, back to $U_A$ if the transferee node $U_B$ is unable to complete, in an allotted time, a stated criteria for the commitment transaction. The return transaction becomes eligible for submission to the blockchain after a specific point in time, nLockTime, has expired. For the return transaction to be executed successfully, it requires the signatures of both the transferor node $U_A$ and transferee node $U_B$. The transfer transaction, $T_t$ is the transaction that actually sends the committed tokens, x, to the transferee node $U_B$. The transfer transaction is executed only if certain criteria are met by the transferee node $U_B$. For example, in order for the transfer transaction to be successfully submitted to the blockchain, it may require at least the digital signature of the transferee node $U_B$.

Blockchain-Based Data Submissions Protocol (BFSP)

The present application describes methods and systems for submitting (or "transferring") data for entities using a blockchain. In particular, the present application proposes a data submissions protocol (Blockchain-based Data Submissions Protocol, or BDSP) which leverages blockchain concepts to allow reviewers to submit data anonymously and to have the data recorded publicly and permanently on a distributed ledger. The BDSP is designed to delink the data from the reviewers or other data sources submitting them, and to only allow "approved" reviewers to have their data accepted/considered for disclosure. By facilitating the public disclosure of feedback on a blockchain, the BDSP may help to prevent manipulation of data (e.g. feedback and/or votes, ratings, etc.) by entities and/or third parties. Furthermore, the BDSP provides an incentive for entities receiving data from reviewers to undertake the tasks of verifying the validity of data submissions and broadcasting the eligible data on a blockchain.

The BDSP includes a plurality of participating nodes (corresponding to reviewers) and at least one entity node (corresponding to entities that receive or are able to receive data such as reviews, ratings, etc.). More specifically, the BDSP is suitable for a group of two or more reviewers, $U_1, \ldots, U_n$, who wish to provide data for one or more entities, $C_1, \ldots, C_n$. For example, the reviewers may be voters casting ballots for one of a set of candidates or members of a group providing reviews of one or more other members. The reviewers may, alternatively, be customers of service providers or product manufacturers that have been granted express permission to submit reviews of specific services or products. As previously explained, to take part in the BDSP and submit data for one of the entities, a reviewer may be required to transfer a fixed quantity of tokens to the entity for whom the data is intended. The transfer of tokens represents a reward to the relevant entity (or data verifier) for checking and broadcasting data submission.

Figure 3:
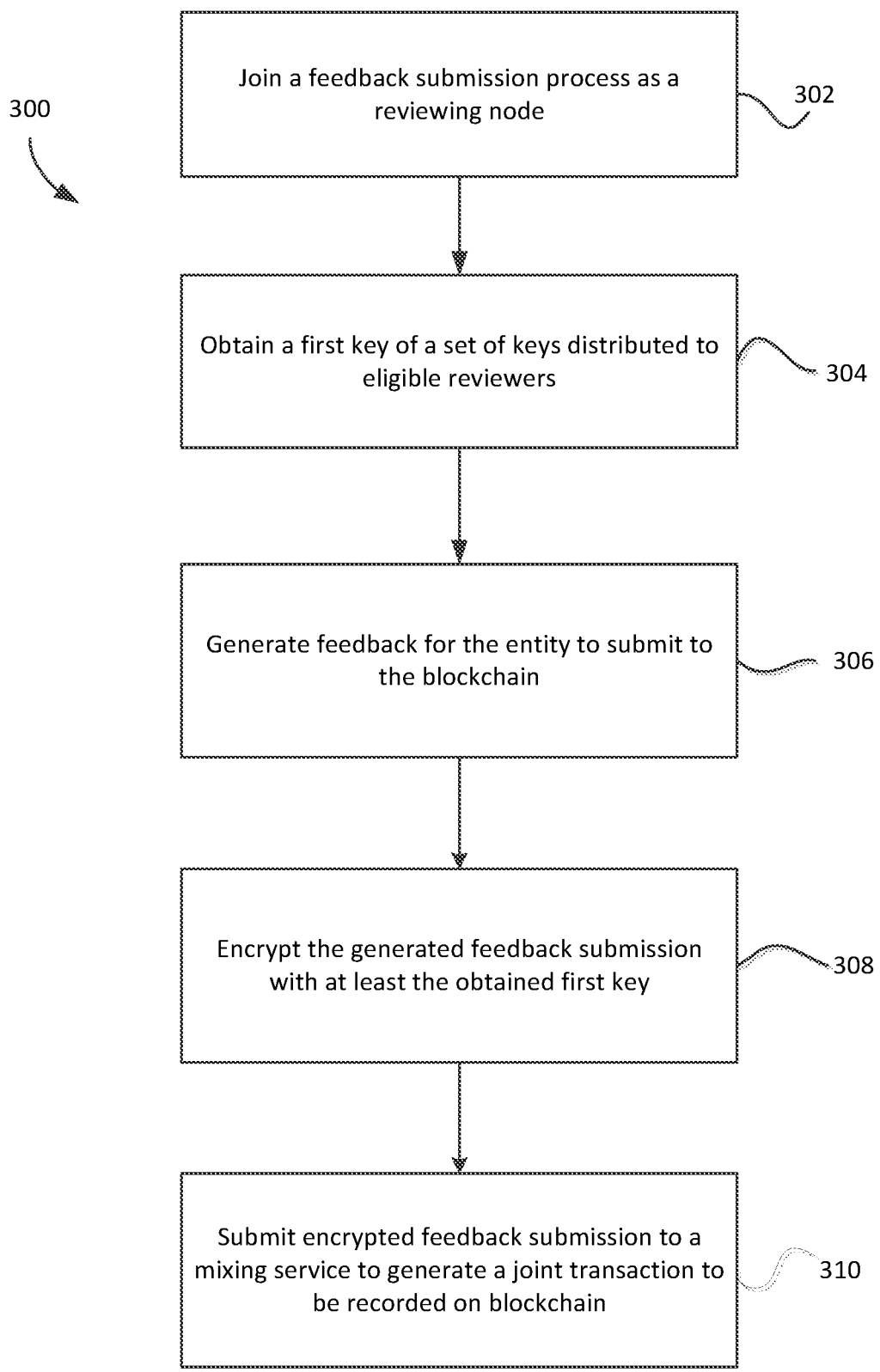
FIG. 3 shows, in flowchart form, an example method for submitting data e.g. feedback for an entity to a blockchain, in accordance with an embodiment of the present application.

Reference is now made to FIG. 3, which shows, in flowchart form, an example method 300 for submitting data for an entity to a blockchain. The method 300 may, for example, be performed by one or more participating nodes participating in the BDSP. As noted above, a plurality of nodes corresponding to multiple reviewers ("participating nodes") and one or more entities ("entity nodes") take part in the BDSP. In some implementations, each node is a wallet or other such blockchain entity.

For simplicity, the following description of BDSP uses the example of multiple reviewers submitting data for a single entity. As will be explained below, the reasoning is easily extended to a data submissions process for multiple entities. That is, the use case of BDSP to submit data for a single entity is readily generalizable to submitting data for a plurality of different entities.

The method 300 is implemented by a node in a blockchain network, such as network 100 of FIG. 1. The method 300 begins with the node joining a process for submitting feedback for a particular entity, in operation 302. The joining step may be implemented in a decentralized manner or through a central authority that assembles a suitable group of participating nodes based, at least in part, on ensuring inclusion of a sufficient number of nodes in the group to allow for anonymization of the submitted data. For example, three or more participating nodes may be required to join before the BDSP can be initiated, to ensure that no individual (i.e. reviewers, candidates, third parties) is able to directly identify the source of any submitted feedback (other than the feedback that they themselves have submitted). In some embodiments, multiple reviewers may join together to collaboratively participate in the BDSP.

In operation 304, the node obtains a first key, where the first key is one of a fixed set of keys distributed to those participating nodes that are eligible to submit data e.g. feedback for the entity. A fixed set of nodes participating in the protocol effectively agree on the keys that would allow access to the data submissions process. In some embodiments, the participating nodes engage in a secret sharing procedure (e.g. dealer-less scheme) to distribute key shares $k_1, k_2, \ldots, k_n$ that can be used to collaboratively construct a secret k. That is, the first key obtained by the node may be a first key share $k_j$ of a group private key k, where the first key share $k_j$ is one of a plurality of key shares that are distributed to eligible participating nodes. In this way, the reviewers themselves have a degree of control on the other reviewers that are endorsed for participation in the BDSP.

In operation 306, the node generates data e.g. feedback $r_j$ for the entity for submission to the blockchain. The format of feedback $r_j$ may be adaptable to different protocol requirements. The feedback $r_j$ may, for example, be a simple numerical rating (e.g. 0-10 preference) or a review submission (e.g. a descriptor, a fixed-length text block, etc.). In some embodiments, the feedback $r_j$ is an alphanumeric string, such as $$\text{review} = r_j = \text{useful000062727hj9}$$

The example feedback $r_j$ includes a review string ("useful") that is concatenated with a second identifiable string ("000062727hj9"). The second string may, in some cases, include information identifying the relevant reviewer-entity pair for the feedback $r_j$. For example, the second string may include a first number, l, of characters from the entity's public key and a second number, p, of characters from the reviewer's key share. The second string may be padded with an escape sequence (e.g. a set of 0's) which separates the review string from the reviewer-entity information.

In operation 308, the feedback $r_j$ is encrypted using at least the first key obtained by the node in operation 304. For example, the feedback $r_j$ may be encrypted with a key share $k_j$ of a group private key k. In some embodiments, the feedback $r_j$ is encrypted using both a public key associated with the entity and the reviewer's key share $k_j$. As part of the BDSP, each entity (or feedback verifier for an entity) may be provided with a public-secret key pair ($Pk_{C_i}, Sk_{C_i}$). The public keys associated with the entities of the BDSP can be distributed to the participating reviewers and used to encrypt feedback submissions. Encrypting feedback $r_j$ with the public key of an entity helps to ensure that only the interested entity will be able to decrypt and access the feedback.

An entity may, in some cases, desire to verify the validity of key shares that are used by reviewers to encrypt their respective feedback. The entity can, for example, use existing solutions, such as verifiable secret sharing (VSS) or publicly verifiable secret sharing (PVSS) schemes, to verify that key shares of participating reviewers are consistent with an encrypted "secret". To facilitate this share verification procedure, reviewers in the BDSP can encrypt their key shares using the public key associated with their entity-of-choice, and collaborate with other eligible reviewers to generate a secret, kG, using their key share. The secret, kG, may, for example, be generated using a secret sharing joining process. The encrypted key share and the generated secret can then be provided to the entity for use in verifying the validity of the key share. For example, the (encrypted) key shares of the reviewers of a particular entity may be pooled in an anonymous manner as part of the BDSP and made accessible to the entity.

One example of an encryption for feedback $r_j$ using the reviewer's key share $k_j$ and the entity's public key $Pk_{C_i}$ is given by:

$$Enc_{Pk_{C_i}}(r_j \oplus k_j) \quad (A)$$

where $\oplus$ represents the XOR ("exclusive or") between the two strings.

Figure 4:
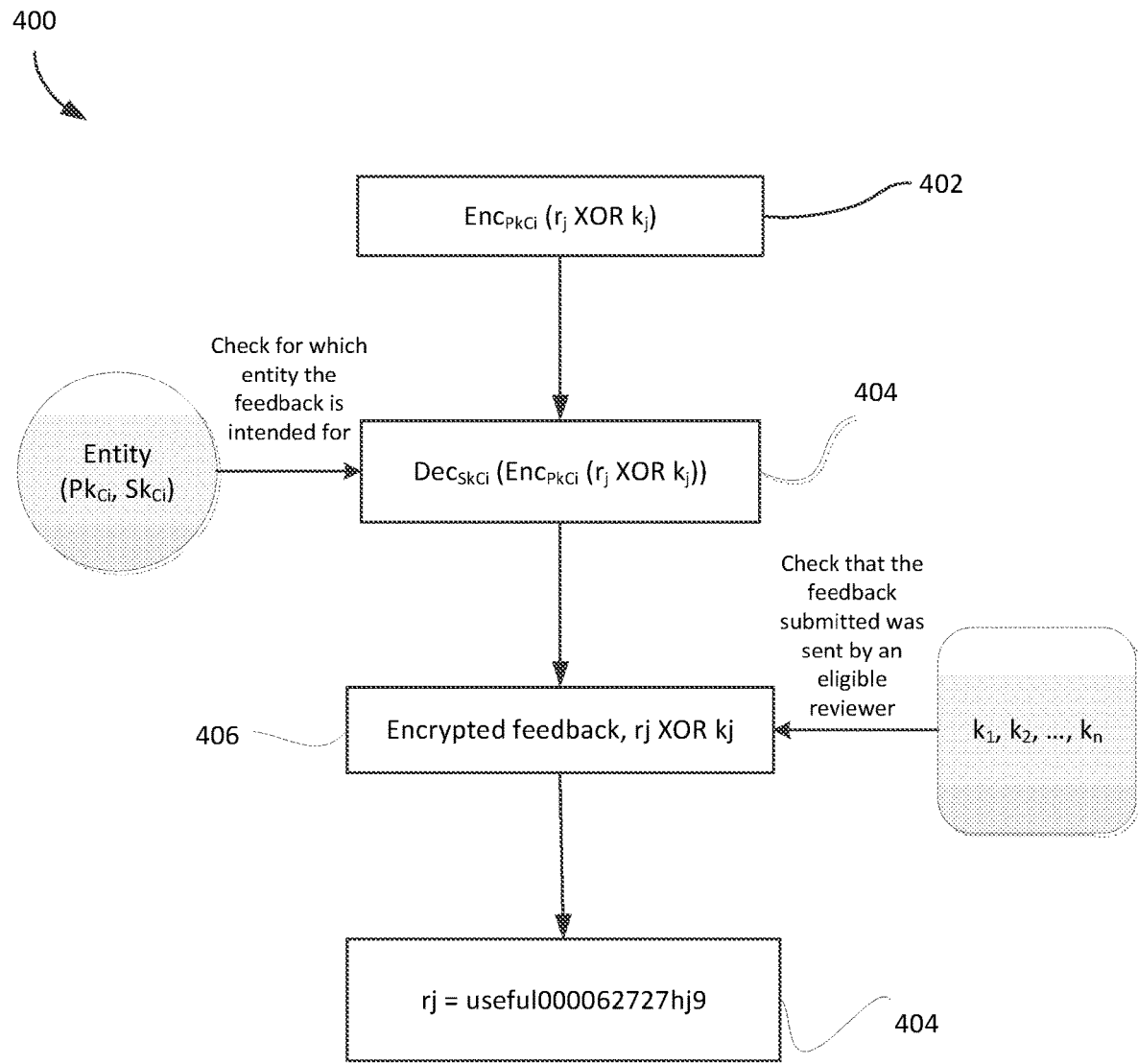
FIG. 4 shows a schematic diagram representing an example process of decrypting an encryption of a data e.g. feedback submission.

FIG. 4 shows a schematic diagram representing the process of decrypting a feedback submission that is encrypted using the example scheme (A) above. At step 402, the encryption of feedback $r_j$ is decrypted by entity $C_i$, using its private key, thereby identifying $C_i$ as the entity for which the feedback $r_j$ is destined. At step 404, the encrypted feedback submission is further decrypted, by computing the XOR between the decrypted data from step 402 and a corresponding reviewer's key share $k_j$. The key shares of reviewers that are eligible to submit feedback for the entity may, for example, be pooled in an anonymous manner from the eligible reviewers and made accessible to the entity, as part of the BDSP. The entity would be able to obtain the feedback $r_j$ at step 304 by performing the operation, $$r_j \oplus k_j \oplus k_j = r_j$$

This "double encryption" of feedback $r_j$—first with the key share $k_j$ and then with the public key $Pk_{C_i}$—allows for a double check on the correctness of the data. In particular, the entity can first decrypt the data using their public key, and subsequently verify that the reviewer providing the encryption of feedback $r_j$ is indeed eligible to participate in the BDSP (i.e. submit feedback to the entity).

Returning to FIG. 3, in step 310, the node submits the encrypted feedback submission to a mixing service. The mixing service is configured to generate a mixed blockchain transaction based on the encryption of feedback $r_j$ and at least one other encrypted feedback submission from one or more other eligible participating nodes. The encryption of feedback $r_j$ may be included in a transaction transferring a fixed quantity of tokens to the entity for whom the feedback is intended, and two or more such transactions (including encrypted feedback submissions from at least one other reviewer participating in the BDSP) may be combined into a single, joint transaction. For example, the transfer transactions may be combined using a token mixing solution such as CoinJoin. In CoinJoin, a set of participants each contribute with one of the inputs of a joint transaction and provide one output address for the outputs of the joint transaction. Token "shuffling" solutions, such as CoinShuffle, CoinShuffle++, and Circle Shuffle, may be implemented in the BFSP to delink the output addresses of the joint transaction from the participants contributing the inputs of the transaction. Such "shuffling" techniques may facilitate obscuring the connections between submitted feedback and their sources (i.e. reviewers) while still using blockchain transactions to transmit encrypted feedback data. The joint transaction transfers a quantity of tokens to the designated entities, where the total quantity of tokens transferred depends on the number of (encrypted) feedback submissions that are included as inputs in the transaction.

In the BDSP, an encrypted feedback submission may be included as a data element in a script associated with a transfer transaction from a participating node to the relevant entity. In the context of the Bitcoin protocol, an encrypted feedback submission may be stored as data in script using the opcode OP_RETURN <data>, which allows for the storage of up to 40 bytes of data, or alternatively, as metadata in an output script for an m-of-n multi-signature scheme. As an example, in a 2-of-3 multi-signature script, of the three data elements that are reserved for public keys, two may be used for public keys and one to store an encrypted feedback submission:

OP_0 *SigA SigB*

{OP_2 $Enc_{Pk_{C_i}}(r_j \oplus k_j)$ *PubA PubB* OP_3 OP_CHECKMULTSIG} where $$meta1 = Enc_{Pk_{C_i}}(r_j \oplus k_j)$$

represents metadata, corresponding to an encrypted feedback submission, that a reviewer wishes to store in the transaction.

The blockchain transactions that are used in the BDSP to convey encrypted feedback and tokens to the relevant entities may be constructed using commitment channels. More specifically, the transmission of an encrypted feedback submission and tokens to a designated entity, $C_i$, from a reviewer, $U_i$, may be effected by a set of three transactions: a commitment transaction $T_C$, a return transaction $T_{r,i}$, and a transfer transaction $T_t$. The transaction $T_C$ represents the commitment component of the feedback submissions protocol. The reviewer $U_i$ commits a specified quantity of tokens, x, that is transferred to an output governed by either: a 2-of-3 multi-signature script, requiring signatures of $U_i$ and entity $C_i$, or knowledge of the (decrypted) feedback $r_j$ and signature of $C_i$. The encryption of feedback $r_j$ is submitted as metadata in the multi-signature script. The commitment transaction may be considered as the input contributed by reviewer $U_i$ to the mixed (joint) blockchain transaction between a set of participating nodes and one or more entity nodes in the BDSP.

Two possible variations of transaction $T_{r,i}$ are proposed in the BDSP. In a first version, $T_{r,1}$, the committed tokens, x, of the transaction $T_C$ are returned to a return address predefined by reviewer $U_i$. To prevent traceability of movement of tokens, the return address is selected to be one that is different from an input address associated with reviewer $U_i$. The return of tokens may be effected if a submitted feedback submission is not correctly broadcast on the blockchain within a predetermined period of time. Such scenarios may arise if the entity is unable to decrypt a feedback submission as the submitting reviewer was malicious and did not possess the credential to access the feedback, or if the entity (or review verifier) simply decided not to broadcast the feedback and receive the associated transfer of tokens.

In an alternate version of the return transaction, $T_{r,2}$, a quantity of tokens equal to x/n, where n is the number of reviewers participating in the BDSP, is transferred to all participating reviewers after expiration of a specified period of time. This procedure could be considered as penalizing those reviewers that submit flawed feedback (e.g. reviews that cannot be decrypted by any of the entities or that are not transmitted by eligible reviewers).

The transaction $T_t$ is the transfer of x tokens from reviewer $U_i$ to entity $C_i$. For this transaction to be successfully executed, the knowledge of the (decrypted) feedback $r_j$ and the signature of entity $C_i$ are required. The transfer transaction may be considered as outputs of the joint transaction that is formed between participating nodes and one or more entity nodes in the BDSP.

In some implementations, reviewers may submit their feedback to third-party entities that are independent of the relevant entity for whom the feedback is intended. In particular, reviewers may wish to provide their opinions of products, services, etc. that are provided by certain entities, without those entities influencing or making the decision whether to publish the submitted feedback. For example, reviews may be submitted, by means of mixed blockchain transactions in the BDSP, to operators of third-party review platforms (e.g. online forum, media outlets, industry regulation bodies, etc.) that are independent of the entities that are reviewed, such that submitted reviews, whether positive or negative, may be broadcast via a blockchain, without the influence or intervention of the relevant being reviewed (or assessed, etc.).

Figure 5:
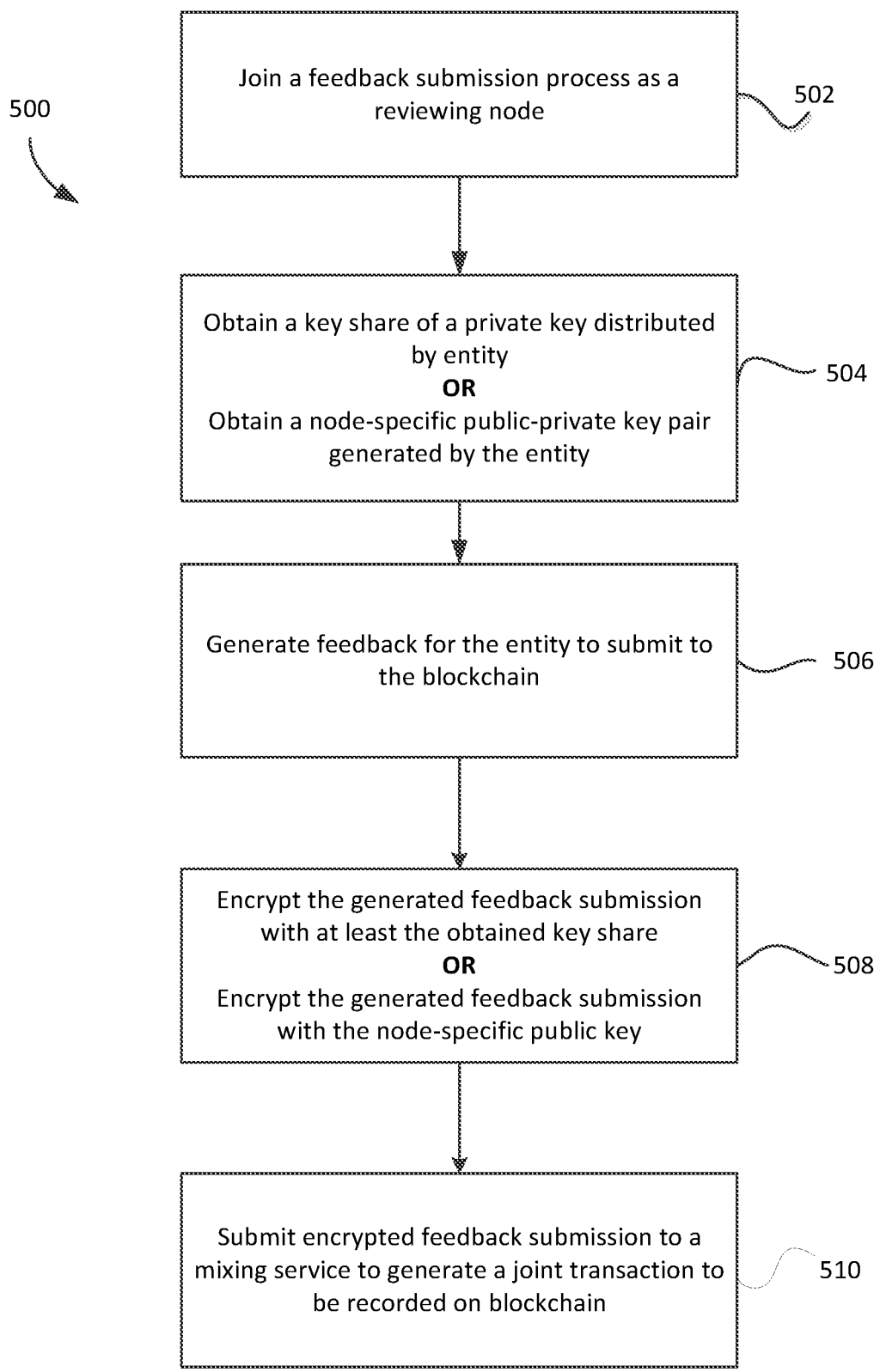
FIG. 5 shows, in flowchart form, another example method for submitting data e.g. feedback for an entity to a blockchain, in accordance with an embodiment of the present application.

Reference is now made to FIG. 5, which shows another example method 500 for submitting data such as feedback for an entity to a blockchain. The method 500 is implemented by a (participating) node in a blockchain network, such as network 100 of FIG. 1. In some instances, the method 500 may be suitable for systems/platforms for reviewing products and services that are offered by manufacturers and/or service providers. For example, the method 500 may be incorporated into a feedback submissions platform for online marketplaces. Entities that offer products/services can give permission to previous clients to publicly and anonymously submit their reviews, using transactions recorded on the blockchain, based, at least in part, on the operations of method 500.

Operations 502, 506 and 510 of method 500 are similar to operations 302, 306 and 310, respectively, of method 300 described with respect to FIG. 3, and will not be discussed in great detail. The participating node joins a feedback submissions process, implemented as part of the BDSP, in operation 502. In operation 504, the node obtains a first key, the first key being one of a fixed set of keys distributed to nodes eligible to submit feedback for the entity. The first key may be a first key share $k_j$ of a private key k. In particular, the entity (or a representative on behalf of the entity) may distribute key shares $k_j, \ldots, k_n$ to users who received its products/services, to be used for feedback encryption and validation. The key share $k_j$ may be released to the reviewer (i.e. user/client), for example, in response to receiving a transaction (e.g. transfer of tokens) or payment for a service that is rendered by the entity to the reviewer/user/client (the key share may, for example, be encrypted with the user/client's public key). Alternatively, an entity may, instead of distributing to users/clients their public key and individual key shares, generate a set of public-private key pairs, one for each eligible or endorsed reviewer. That is, an entity, $C_i$ may produce a set of node-specific keys for the set of endorsed users/clients, where $$\text{keys}=\{(Pk_{C_i}^1, Sk_{C_i}^1), (Pk_{C_i}^2, Sk_{C_i}^2), \ldots, (Pk_{C_i}^n, Sk_{C_i}^n)\}$$

and secretly send the public keys $Pk_{C_i}^j$'s to the respective reviewers.

In operation 506, the node generates feedback $r_j$ of the entity for submission to the blockchain. The format of feedback $r_j$ may be similar to that described with respect to operation 306 of method 300. In the specific context of method 500, the feedback $r_j$ may additionally include a string which identifies a product/service that is provided by the entity and being reviewed by the user/client. An example feedback $r_j$ may be in the form, $$\text{review}=r_j=\text{useful000062727}hj9\text{\#productID}$$

In operation 508, the feedback $r_j$ is encrypted prior to being transmitted to the entity for whom the feedback is intended. The encryption scheme (A) discussed above may be applied in operation 408. That is, the reviewer may compute (off-chain) the encryption $$Enc_{Pk_{C_i}}(r_j \oplus k_j)$$

of feedback $r_j$, where ⊕ represents the XOR between the two strings. Alternatively, if the entity has produced node-specific public-private key pairs for the eligible reviewers, the feedback $r_j$ may be encrypted simply by using the node-/user-specific public key $Pk_{C_i}^j$ for the entity. The encrypted feedback may be computed off-chain by the reviewer, whereby the entity retains the corresponding decryption key allowing the entity to obtain the feedback.

In operation 510, the encrypted feedback is submitted to a mixing service to generate a joint transaction that will be recorded on the blockchain. As explained above, an entity that is reviewed can verify the validity of a feedback submission, by checking whether the feedback is submitted by an eligible/endorsed reviewer (e.g. verifying that the reviewer possesses a valid key share of a group private key for an endorsed group). The entity can decrypt the encryption of the feedback and subsequently broadcast the feedback on the blockchain. The validation and broadcasting of the submitted feedback, then, are pre-conditions for the entity to receive tokens transferred by the reviewer as part of the feedback submission transaction.

Figure 6:
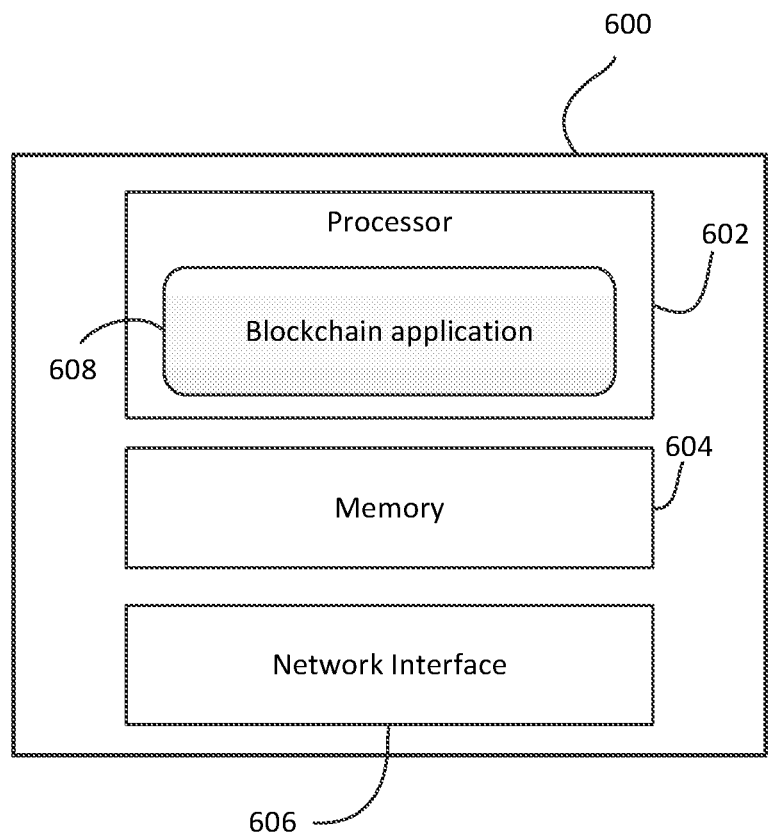
FIG. 6 shows, in block diagram form, an example blockchain node.

Reference will now be made to FIG. 6, which shows, in block diagram form, a simplified example of a node 600, which may, in the context of the present disclosure, be a participating node and/or an entity node. The node 600 includes a processor 602, which may include one or more microprocessors, application specific integrated chips (ASICs), microcontrollers, or similar computer processing devices. The node 600 further includes memory 604, which may include persistent and non-persistent memory, to store values, variables, and in some instances processor-executable program instructions, and a network interface 606 to provide network connectivity over wired or wireless networks.

The node 600 includes a processor-executable blockchain application 608 containing processor-executable instructions that, when executed, cause the processor 602 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
   obtaining a first key, the first key being one of a fixed set of keys distributed to nodes that are eligible to submit data for an entity to a blockchain;
   generating first data ($r_j$) of the entity for submission to the blockchain;
   encrypting the first data ($r_j$) using at least the first key; and
   submitting the encrypted first data to a mixing service, the mixing service being configured to generate a mixed transaction based on the encrypted first data and at least one other encrypted data submission from one or more eligible nodes.

2. The method of claim 1, wherein the first key is a first key share ( ) of a private key ( ), the first key share ($k_j$) being one of a plurality of key shares that are distributed to eligible nodes and that are used for collaboratively constructing the private key (k).

3. The method of claim 2, wherein the first data ($r_j$) is encrypted using the first key share ($k_j$) and a public key ($Pk_{C_i}$) associated with the entity.

4. The method of claim 3, further comprising:
   encrypting the first key share ($k_j$) using the public key ($Pk_{C_i}$) associated with the entity;
   collaborating with other eligible nodes to generate a secret (kG) using the first key share ($k_j$); and
   providing the encrypted first key share ( ) and the generated secret (kG) to an entity node associated with the entity for use in verifying the validity of the first key share ($k_j$).

5. The method of claim 4, wherein the secret (kG) is collaboratively generated based on a secret share joining process.

6. The method of claim 1, wherein the first data ($r_j$) comprises an alphanumeric string.

7. The method of claim 6, wherein the first data ($r_j$) comprises a concatenation of a data string and a second string containing at least a portion of a public key ($Pk_{C_i}$) associated with the entity.

8. The method of claim 7, wherein the first data ($r_j$) further includes a third string identifying a service provided by the entity.

9. The method of claim 2, wherein obtaining the first key comprises receiving the first key share ($k_j$) from the entity.

10. The method of claim 9, wherein the first key share is received from the entity in response to a transfer of tokens to an entity node associated with the entity for a service rendered by the entity.

11. The method of claim 2, wherein the first data ($r_j$) is encrypted using an exclusive-or encryption.

12. The method of claim 1, wherein the first key ($k_i$) is a first public key ( ) associated with the entity, the first public key ($Pk_{C_i}^j$) being one of a first set of node-specific public keys that are generated by the entity and that are distributed to eligible nodes, each of the public keys in the first set having a corresponding private key that is retained by the entity.

13. The method of claim 1, wherein the mixed transaction specifies a first quantity of tokens to transfer to the entity, the first quantity depending on a number of encrypted data submissions of the entity that are included as inputs in the mixed transaction.

14. A computing device to participate in a process for submitting data for an entity to a blockchain, the computing device comprising:

a processor; and memory including executable instructions that, as a result of execution by the processor, cause the computing device to carry out the method claimed in claim 1.

15. A non-transitory processor-readable medium storing processor-executable instructions to participate in a process for submitting data for an entity to a blockchain, wherein the processor-executable instructions, when executed by a processor, cause the processor to carry out the method claimed in claim 1.

16. A computing device to participate in a process for submitting data for an entity to a blockchain, the computing device comprising:

a processor; and memory including executable instructions that, as a result of execution by the processor, cause the computing device to carry out the method claimed in claim 2.

17. A computing device to participate in a process for submitting data for an entity to a blockchain, the computing device comprising:

a processor; and memory including executable instructions that, as a result of execution by the processor, cause the computing device to carry out the method claimed in claim 6.

18. A computing device to participate in a process for submitting data for an entity to a blockchain, the computing device comprising:

a processor; and memory including executable instructions that, as a result of execution by the processor, cause the computing device to carry out the method claimed in claim 12.

19. A computing device to participate in a process for submitting data for an entity to a blockchain, the computing device comprising:

a processor; and memory including executable instructions that, as a result of execution by the processor, cause the computing device to carry out the method claimed in claim 13.

20. A non-transitory processor-readable medium storing processor-executable instructions to participate in a process for submitting data for an entity to a blockchain, wherein the processor-executable instructions, when executed by a processor, cause the processor to carry out the method claimed in claim 2.

* * * * *